United States Patent [19]

Hellermann et al.

[11] Patent Number: 5,147,939
[45] Date of Patent: Sep. 15, 1992

[54] UNSATURATED, ELASTOMERIC, ASYMMETRICALLY COUPLED BLOCK COPOLYMER, A SINGLE BATCH PROCESS FOR ITS MANUFACTURE AND ITS USE FOR THE PRODUCTION OF TIRE COMPONENTS

[75] Inventors: Walter Hellermann, Dorsten; Christoph Herrmann; Karl-Heinz Nordsiek, both of Marl; Jürgen Wolpers, Haltern; Hans-Bernd Fuchs, Marl, all of Fed. Rep. of Germany

[73] Assignee: Huels Aktiengesellschaft, Marl, Fed. Rep. of Germany

[21] Appl. No.: 416,978

[22] Filed: Oct. 4, 1989

[30] Foreign Application Priority Data

Oct. 5, 1988 [DE] Fed. Rep. of Germany ....... 3833760

[51] Int. Cl.$^5$ ................... C08F 297/02; C08F 297/04; B60C 11/00
[52] U.S. Cl. .................... 525/314; 525/250; 525/258; 525/271; 152/209 R
[58] Field of Search ......................................... 525/314

[56] References Cited

U.S. PATENT DOCUMENTS 4,391,949  7/1983  St. Clair ............................ 525/314
4,814,386  3/1989  Hellermann et al. ............... 525/314

*Primary Examiner*—James J. Seidleck
*Assistant Examiner*—Vasu S. Jagannathan
*Attorney, Agent, or Firm*—Oblon, Spivak, McClelland, Maier & Neustadt

[57] ABSTRACT

An unsaturated, elastomeric, asymmetrically coupled block copolymer of the formula:

$$(A-B)_n-X-(B)_m,$$

wherein block A is a block of polybutadiene having an 8 to 60% content of uniformly distributed vinyl groups and block B is a homopolymer of isoprene or a copolymer of at leat 10% isoprene units with 0 to 60% butadiene units and up to 45% styrene units and X is a radical of a coupling agent, and $(m-n) \geqq 0$ while $(m+n)$ ranges from 3 to 25.

4 Claims, 1 Drawing Sheet

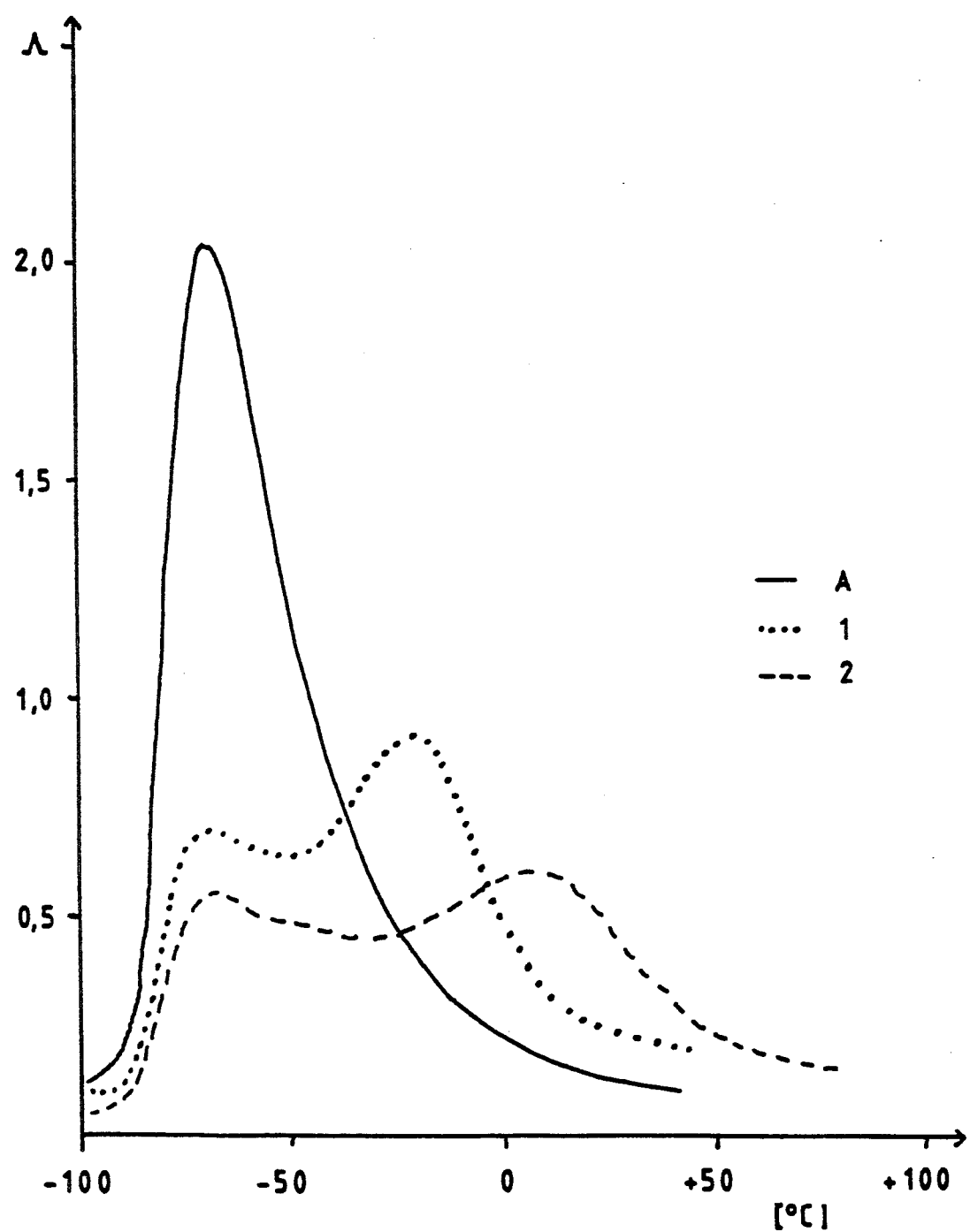

UNSATURATED, ELASTOMERIC, ASYMMETRICALLY COUPLED BLOCK COPOLYMER, A SINGLE BATCH PROCESS FOR ITS MANUFACTURE AND ITS USE FOR THE PRODUCTION OF TIRE COMPONENTS

BACKGROUND OF THE INVENTION

1. Field of the Invention

The present invention relates to an asymmetrically coupled block copolymer and to a single batch process for its manufacture. The copolymer is useful in the production of tire components.

2. Description of Background

It is generally known that the properties of a rubber are determined to a far-reaching extent by the pattern of the tan delta curve. It is also known that a wide peak in the tan delta curve has a favorable affect on a series of antagonistic rubber properties such as improving the skid resistance, reducing the dynamic heat formation and lowering the rolling resistance without reducing abrasion resistance and providing continuous use on a daily basis.

In the past numerous attempts have been made to develop rubbers which have a high level of qualities. In order to attain as favorable as possible a compromise between the properties which, in part, are contradictory, mixtures of different rubbers have been employed. Another avenue which has also been followed is the use of copolymers prepared from two different polymer blocks. Thus, copolymers are known which differ in the nature of their chemical composition and/or their structure. Examples are styrene-butadiene block copolymers, the blocks A and B of which have different styrene and/or vinyl contents. The processing of such copolymers is relatively difficult. Another possibility of modifying the properties of rubber and in particular of improving the cold flow of rubber resides in coupling the so-called "living polymers" present towards the end of the polymerization with polyfunctional coupling agents such as polyhalogenides or polyalkenyl aromatic compounds. Often, however, the coupling yield, i.e., the percentage of coupled products in relation to the total amount of polymerization products is very low. According to this principle one invariably obtains coupling products, the arms of which are identical with respect to molecular weight composition and structure. In principle, coupling products are also known which have different arms. However, those products invariably contain blocks composed of styrene or butadiene units. Apart from the aforegoing, thermoplastic coupling products with different arms are known. To date there has been no report of use of such products in manufacture. For example, U.S. Pat. No. 4,248,983 discloses thermoplastic star-shaped block copolymers having the formula:

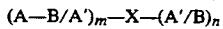

which contains 60 to 95% styrene and 40 to 5% of a conjugated diene. Component A of the formula represents a nonelastomeric polymer segment which contains 80 to 90% styrene. A'/B and B/A' represent elastomeric polymer segments based on styrene and a conjugated diene. These products are manufactured by polymerizing the nonelastomeric segment A, adding an initiator, continuing the reaction by polymerizing a mixture of styrene and a diene and finally carrying out coupling.

Similar block copolymers are known from U.S Pat. Nos. 4,180,530; 4,221,884 and 4,248,980 to 4,248,984.

U.S. Pat. No. 4,391,949 discloses coating compositions based on star-shaped block polymers of the formula:

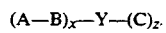

Y in this formula represents a coupling agent, A the polymer of a monovinyl aromatic compound such as, for example, a polystyrene block, and B and C polymers of conjugated dienes, for example, polybutadiene blocks. The two polymers A-B and C are initially produced in two separate reactors. Thereafter, the contents of both reactors are combined and the coupling agent is added.

All known block copolymers are subject to at least one of the following shortcomings:

(i) The block copolymers do not adequately satisfy the increased demands placed upon them in their use as a tire material.

(ii) Problems arise regarding the compatibility of the two blocks.

(iii) The tan delta curve exhibits only a narrow damping maximum.

A need therefore continues to exist for rubbers which exhibit improved properties, particularly in their use as a tire material.

SUMMARY OF THE INVENTION

Accordingly, one object of the present invention is to prepare a star-shaped rubber which has a tan delta curve having as wide as possible an oscillatory damping region.

Briefly, this object and other objects of the present invention as hereinafter will become more readily apparent can be attained by an unsaturated, elastomeric, asymmetrically coupled block copolymer of the formula:

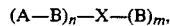

wherein block A is a block of polybutadiene having an 8 to 60% content of uniformly distributed vinyl groups and block B is a homopolymer of isoprene or a copolymer of at least 10% isoprene units with 0 to 60% butadiene units and up to 45% styrene units and X is a radical of a coupling agent, and $(m-n) \geq 0$ while $(m+n)$ ranges from 3 to 25.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein the FIGURE shows the tan delta curve of embodiments of the present rubber composition and a symmetrical block copolymer rubber.

DETAILED DESCRIPTION OF THE PREFERRED EMBODIMENTS

Another principle of interlinking rubbers has now been found. It is possible to obtain rubber having clearly broadened tan delta curves as shown in the FIGURE. Because, as is known, rubber properties can be influenced favorably in this manner, another parameter for optimizing tire properties is made available to the tire expert. The rubber of the present invention is characterized by the known advantages of coupled rubbers (cf. EP-OS 0 090 365), as well as rubbers of high vinyl content (K. H. Nordsiek, K. M. Kiepart, Kautschuk und Gummi, Kunststoffe, 35, 371 (1982)). The present styrene-containing rubbers contain a statistical distribution of styrene units. The content of block polystyrene components is below 2%.

The single batch process for the manufacture of the present rubber, which is an embodiment of the present invention, provides a high coupling yield.

The unsaturated elastomeric asymmetrically coupled block copolymer of the present invention has the formula:

$$(A-B)_n-X-(B)_m$$

based on butadiene, and optionally isoprene and styrene. The copolymer preferably contains 40 to 90% butadiene, 0 to 40% isoprene and 0 to 30% styrene. X represents the moiety of a polyfunctional coupling agent. The numeral m is at least as large as n. The sum total of m and n should, on the one hand, be at least 3 and, on the other hand, at most 25. The blocks A preferably represent 40 to 80% of all blocks in the copolymer, while the blocks B correspondingly 60 to 20% of all blocks in the block copolymers. The blocks A preferably consist exclusively of butadiene units having a vinyl group content between 8 and 60%. The blocks B are represented by from 0 to 60% of butadiene units, at least 10% of isoprene units and a maximum of 45% styrene units. The content of vinyl and 3,4 isopropenyl groups, based on block B, is in the range of 75 to 90%.

An embodiment of the invention is that the rubber is prepared by a single batch process. The present block copolymer is prepared by the polymerization of the monomers in an inert organic solvent in the presence of a monofunctional Li compound. A characteristic of the process is the production of block A upon the addition of catalyst, while block B is produced after renewed addition of catalyst and monomer in the presence of a suitable cocatalyst, whereafter coupling is carried out.

In the present process the asymmetrically coupled block copolymers according to the invention are formed quite predominantly. In principle, it is also possible in the present process for symmetrically coupled block copolymers to be formed. However, from tests which have been conducted it is apparent that the content of such products is very low. For that reason the present description refers consistently only to asymmetrically coupled products.

The present invention differs from that of copending application having Ser. No. 07/417,699 filed Oct. 5, 1989, now U.S. Pat. No. 5,061,758 in the following respects:

(i) The block copolymer of the present invention has the formula $(A-B)_n-X-(B)_m$, whereas the block copolymer of the above copending application, on the other hand, has the formula: $(A)_n-X-(B)_m$.

(ii) The block copolymer of the present invention is produced by a single batch process, while the above block copolymer of the copending application is produced by a dual batch process.

In the process of the present invention an inert organic solvent is used as the reaction medium. Suitable solvents include hydrocarbons having 5 to 12 C atoms such as pentane, hexane, heptane, octane and decane, as well as their cyclic analogues. Also suitable are aromatic solvents such as e.g., benzene, toluene, xylene and others. It stands to reason that mixtures of the above described solvents can also be employed.

Alkyl lithium compounds which can readily be obtained by the reaction of lithium with the corresponding alkylhalogenides are employed as catalysts. The alkyl moieties comprise 1 to 10 C atoms. Individual hydrogen atoms may be substituted by phenyl moieties. Suitable alkyl lithium compounds include methyl lithium, ethyl lithium, pentyl lithium, n-butyl lithium and the like.

The catalyst is added at the start of the polymerization of block A and of block B. In addition it may be advantageous to add a small amount of catalyst during the polymerization of the first block.

The nature and amount of catalyst and branching agent are generally so selected that the block copolymer obtained has the following properties:

Mooney viscosity (ML$_{1-4}$, 100° C. DIN 53 523): 35 to 120;

Non-uniformity U=(Mw/Mn)−1, determined by gel permeation chromatographic analysis (GPC analysis): 0.6 to 4.0;

Defo elasticity (80° C., DIN 53 514): ≧20;

In the present process block B is prepared in the presence of a cocatalyst. In that case the object is to obtain polymers having the highest possible content of 1,2 and/or 3,4 structural units.

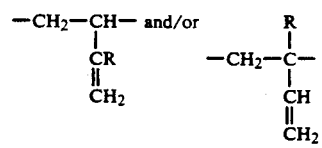

R=H (butadiene)
R=CH$_3$ (isoprene)

Thus the cocatalysts are selected in accordance with their ability to maintain the living polymer ends and to control the microstructure, i.e. the manner in which the polymerization proceeds in respect to directing it towards as complete as possible a formation of 1,2 and-/or 3,4 structural units.

Suitable cocatalysts comprise in particular dialkyl ethers of ethylene glycol, their alkyl groups each comprising up to 4 C atoms, such as ethylene glycol diethyl ether (DEE). Ethers of the formula:

$$R_1-O-CH(R_3)-CH_2-O-R_2$$

are preferred, with R$_1$ and R$_2$ representing alkyl moieties having different numbers of C atoms selected from the group of methyl, ethyl, n- and iso-propyl, as well as n-, iso-, sec- and tert-butyl and R$_3$ represents hydrogen, methyl or ethyl. Preferably the sum total of the C atoms of the two moieties R$_1$ and R$_2$ is from 5 to 7, more particularly 6. A particularly suitable ethylene glycol ether is the compound wherein R$_1$=ethyl, R$_2$ =tert-butyl and R$_3$ =H.

The glycol ethers are, for example, prepared by a process such as the Williamson synthesis from a sodium alcoholate and an alkyl halogenide.

The ethers of the formula:

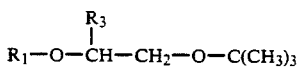

may be produced in a simple manner by reacting the corresponding alcohol

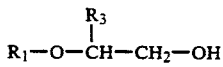

with isobutene in the presence of an acid ion exchanger.

The cocatalyst is employed in the reaction in a ratio of 2:1 to 30:1, in particular 2:1 to 15:1, based on the number of moles of the catalyst. At higher temperatures larger quantities of cocatalyst are generally required in order to attain the desired microstructure control. Reaction temperatures of 100° C. should not be exceeded. It is possible, also, to operate at increasing or decreasing temperatures; in that case, however, care must be taken that the microstructure does not suffer fundamental change.

When producing block A the amount of cocatalyst which is to be present depends on the desired content of vinyl groups.

In the production of the block B and, where applicable, A, styrene may be added as a comonomer. Care must be taken by suitable expedients to ensure that the content of polystyrene blocks does not exceed 2% by weight. A process for determining the content of polystyrene blocks is described in the textbook Houben-Weyl "Methoden der Organischen Chemie", Vol. 14/1 (1061), page 698.

It is known that certain compounds proposed as cocatalysts have the property of suppressing the formation of polystyrene blocks. The same property is present in compounds which are known as randomizers and which are usually potassium salts of alcoholates, as well as organic carboxylic and sulfonic acids. In the event that the randomizing effect of the cocatalyst is inadequate, it is possible to add randomizers.

Suitable coupling agents include polyepoxides such as epoxidized linseed oil, polyisocyanates, polyketones such as 1,3,6-hexanetrione, polyanhydrides, for example the dianhydride of pyromellitic acid and dicarboxylic acid esters such as adipic acid dimethylester.

Particularly suitable are:
(a) The tetrahalogenides of the elements Si, Ge, Sn and Pb, in particular SiCl$_4$.
(b) Organic compounds of the formula R$_n$[SiHal$_3$]$_n$, wherein n=1 to 6, in particular n=1 and 2. In this context R is an organic moiety having a valency of n, for example an aliphatic, cycloaliphatic or aromatic moiety having 6-16 C atoms. 1,2,4-Tris(2-trichlorosilylethyl)-cyclohexane, 1,8-bis(trichlorosilyl)-octane and 1-(trichlorosilyl)-octane may serve as examples.
(c) Organic compounds which contain at least once the moiety=SiHal$_2$, e.g. dimethylsilylchloride.
(d) Halogen hydrosilanes of the general formula Si(H)$_m$(Hal)$_{4-m}$ wherein m is from 3 to 1.
(e) Di- and trivinylbenzenes, e.g. 1,4-divinylbenzene.
Divinyl benzene is preferred as a coupling agent.

The copolymerization reaction should be conducted under a non-oxidizing inert atmosphere such as nitrogen gas. Further, the polymerization temperature ranges from 0°-150° C. In particular, the desired microstructure of the copolymer and economic considerations contribute to the selection of a suitable temperature in that the 1,2 BR and 3,4 IR contents depend on the polymerization temperature selected, as well as the BuLi:-cocatalyst ratio (microstructure regulator).

The process may be conducted discontinuously as well as continuously.

It is within the appreciation of one of skill in the art to produce block copolymer having desired combinations of properties which can be processed into tire treads by varying the reaction conditions by knowledge of the tan delta curve.

The amorphous polymers obtained are mixed with active reinforcing fillers, a vulcanizing agent and conventional additives if they are to be converted into vulcanization products. Generally speaking, it is necessary to carry out such mixing by the application of shear forces.

Compositions which are intended for the manufacture of tire treads are generally formed into running strips. During the homogenization and molding which may for example take place in an extruder the conditions of temperature and time are so selected that no vulcanization takes place.

The rubber component in the vulcanizable compositions may be comprised of, for example, more than 70 and in particular 100 weight % of the block copolymer of the invention and 0 to 30 weight % of a known amorphous general purpose rubber, e.g., styrene-butadiene rubber, 1,4-cis-polybutadiene, 1,4-cis-polyisoprene and natural rubber. If desired the content of all purpose rubber may even be raised substantially higher.

Active, reinforcing fillers include, for example, tire tread carbon black compositions of various activities, optionally treated with silane bonding agents, highly dispersed silicic acids and mixtures thereof.

Conventional vulcanizing agents which may be employed contain e.g., sulfur in combination with accelerators. The amount of vulcanizing agent depends on the remaining components in the vulcanizable composition and can be determined by simple preliminary tests.

Plasticizer oils, as conventionally used in rubber technology, preferably aromatic, aliphatic and naphthenic hydrocarbons and conventional auxiliaries, for example, zinc oxide, stearic acid, rosin acids, ageing protective agents and ozone protective waxes may serve as additives, added in conventional quantities.

The block copolymers of the invention, are suitable for the manufacture of tire treads for automobile tires and truck tires, not only for the manufacture of new tires, but also for the retreading of old tires.

The tire treads are characterized in particular by the following advantageous properties:
(i) high skid resistance under wet conditions,
(ii) high abrasion resistance,
(iii) low rolling resistance and thus low fuel consumption,
(iv) high wear resistance, and
(v) all-weather suitability.

Having now generally described this invention, a further understanding can be obtained by reference to certain specific examples which are provided herein for purposes of illustration only and are not intended to be limiting unless otherwise specified.

A hydrocarbon mixture, as used in the present examples as the solvent, comprises about 50% hexane. Additional components of this hydrogenated C$_6$ fraction may in particular, include pentane, heptane and octane and their isomers. The solvent can be dried over a molecular sieve of pore size 0.4 nm, such that the water content is lowered below 10 ppm, followed by $N_2$ stripping.

The organic lithium compound employed was n-butyl lithium which, unless stated otherwise, was employed in the form of a 20 weight % solution in hexane.

The reacting isoprene and styrene were boiled under reflux over calcium hydride for 24 hours prior to use, distilled and then titrated to the end point with n-butyl lithium in the presence of o-phenanthroline.

The glycol ethers were distilled over calcium hydride and subsequently titrated to the end point with n-butyl lithium in the presence of o-phenanthroline.

The divinyl benzene (DVB) was present as a mixture of m- and p-divinyl benzene and was employed in the form of a 64% solution in hexane. The extent of conversion was determined by determining the solids content after evaporation of the solvent and the monomers.

The tan delta curves were determined with a torsion pendulum according to Schmieder Wolf as set out in DIN 53 520.

The coupling yield is considered to be the percentage of rubber which, after the conversion with a coupling agent, comprises a star-shaped structure and is characterized as compared with the non-coupled rubber by a considerably higher molecular weight. This is determined by GPC analysis, tetrahydrofuran being used as solvent and polystyrene as the column material. The polymers are characterized by means of a light scattering detector. For that purpose samples are taken from the reactor prior to the addition of the coupling agent and also towards the end of the reaction. The Defo hardness (DH) and the Defo elasticity (DE) were determined by conventional measuring methods (DIN 53 514).

Parts are given in terms of parts by weight, while percentages (%) are expressed in terms of weight %.

Comparative Example A 654 parts hexane and 67 parts 1,3 butadiene were initially introduced into a stainless steel V2A agitating autoclave rinsed with dry nitrogen. This was followed by heating to 50° C. and titration with a 5% solution of n-butyl lithium in hexane with thermoelectric control. The polymerization was started at 50° C. by the addition of 0.066 parts n-butyl lithium. The temperature was maintained constant by cooling. After 2 hours, when the butadiene had been converted, 33 parts isoprene and 0.83 part 1-ethoxy-2-tert-butoxyethane were added at 50° C. and fully polymerized in 60 minutes. Thereafter 1.37 parts DVB were added at 50° C. After 1 hour at 50° C. cooling to room temperature took place and 0.5 part 2,2'-methylene-bis-(4-methyl-6-tert-butyl phenol) were added. The resulting rubber was precipitated by means of a mixture of isopropanol and methanol in a volume ratio of 80:20 and dried for 24 hours at 70° in a circulatory drying cabinet.

EXAMPLE 1

654 parts hexane and 67 parts 1,3-butadiene were initially introduced into a stainless steel V2A agitating autoclave rinsed with dry nitrogen. This was followed by heating to 50° C. and titration with a 5% solution of n-butyl lithium in hexane with thermoelectric control. The polymerization was started at 50° C. by the addition of 0.048 parts n-butyl lithium. The temperature was kept constant by cooling. After 2 hours when 90% of the butadiene had been converted, 33 parts isoprene, 0.83 part 1-ethoxy-2-tert-butoxyethane and 0.030 part n-butyl lithium were added at 50° C. and fully polymerized in 90 minutes. Thereafter 1.59 parts DVB were added at 50° C. After 1 hour at 50° C. cooling took place at room temperature and 0.5 part 2,2'-methylene-bis-(4-methyl-6-tert-butylphenol) were added. The resulting rubber was precipitated with a mixture of isopropanol and methanol in a volume ratio of 80:20 and dried for 24 hours at 70° C. in a circulatory drying cabinet.

EXAMPLE 2

594 parts hexane and 61 parts 1,3-butadiene were initially introduced into a stainless steel V2A agitating autoclave rinsed with dry nitrogen. This was followed by heating to 50° C. and titration with a 5% solution of N-butyl lithium in hexane with thermal electric control. The polymerization was started at 50° C. by the addition of 0.044 part n-butyl lithium. The temperature was maintained constant by cooling. After 2 hours, when the butadiene had been converted, 15 parts isoprene, 15 parts styrene, 9 parts butadiene-1,3, 0.75 part 1-ethoxy-2-tert-butoxyethane and 0.027 part n-butyl lithium were added at 50° C. and polymerized to completion for 90 minutes. Thereafter 1.4 parts DVB were added at 50° C. After 1 hour at 50° C. cooling took place to room temperature and 0.5 parts 2,2'-methylenebis-(4-methyl-6-tert-butylphenol) were added. The resulting rubber was precipitated with a mixture of isopropanol and methanol in a volume ratio of 80:20 and dried for 24 hours at 70° C. in a circulatory drying cabinet.

TABLE

Composition of the block copolymerization product

| Example | Butadiene | | | Isoprene | | Styrene |
|---|---|---|---|---|---|---|
| | 1,4 trans | 1,4 cis | 1,2 | 3,4 | 1,4 | |
| A | 36 | 27 | 8 | 26 | 3 | — |
| 1 | 35 | 26 | 9 | 26 | 4 | — |
| 2 | 32 | 25 | 11 | 11 | 4 | 17 |

TABLE

Macrostructure of the block copolymerized product

| Example | U[1] | K[2] |
|---|---|---|
| A | 1.8 | 80 |
| 1 | 2.7 | 60 |
| 2 | 3.0 | 60 |

[1] U = non-uniformity
[2] K = coupling yield

In the comparative Example A a symmetrical block copolymer of the formula $(A-B)_n-X$ was produced. Example 1 describes the production of a non-symmetrical block polymer of the invention of the formula $(A-B)_n-X-(B)_m$. Both block copolymers were obtained from the same monomer mixture. The FIGURE shows that the tan Delta curve of the non-symmetrical block copolymers of the invention are substantially broader than the corresponding symmetrical block copolymers.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. An unsaturated, elastomeric, asymmetrically coupled block copolymer of the formula (I):

$$(A-B)_n-X-(B)_m, \quad (I)$$

wherein block A is a block of polybutadiene having an 8 to 60% content of uniformly distributed vinyl groups and block B is a homopolymer of isoprene or a copolymer of at least 10% isoprene units with 0 to 60% butadiene units and up to 45% styrene units, X is a radical of a polyfunctional coupling agent having a functionality of at least 3, and (m-n)≧0 while (m+n) ranges from 3 to 25 and n is a positive number.

2. The block copolymer according to claim 1, wherein said block copolymer of formula (I) is comprised of 40–90% of butadiene, up to 40% of isoprene, and 0 to 30% of styrene.

3. The block copolymer according to claim 1 or 2, wherein block A represents 40 to 80% of all blocks and the blocks B represents 60 to 20% of all blocks.

4. The block copolymer according to claim 1 wherein the block A represents 40 to 80% of all blocks, the blocks B represent 60 to 20%s of all blocks, each of the blocks B is a copolymer of butadiene and isoprene with 0 to 45% styrene having a vinyl and 3,4 isopropenyl group content of 75 to 90%.

* * * * *